United States Patent [19]

Thibodeaux

[11] Patent Number: 4,934,895
[45] Date of Patent: Jun. 19, 1990

[54] COMBINATION TRUCK AND BOAT TRAILER APPARATUS

[76] Inventor: Emile Thibodeaux, Route 3, Box 512, Eunice, La. 70535

[21] Appl. No.: 76,348

[22] Filed: Jul. 22, 1987

[51] Int. Cl.$^5$ .............................................. B60P 3/10
[52] U.S. Cl. ................................... 414/482; 414/494; 414/532; 280/414.1
[58] Field of Search ............... 414/529, 469, 480, 498, 414/500, 537, 538, 482, 484, 532, 469, 480, 494, 538; 296/157, 182; 280/414.1, 414.2, 414.3, ; 405/3; 410/14, 17; 193/35 R, 35 C

[56] References Cited

U.S. PATENT DOCUMENTS

| | | | |
|---|---|---|---|
| 1,870,573 | 8/1932 | Kuchar | 414/500 X |
| 2,834,492 | 3/1956 | Roy, Sr. et al. | 414/494 X |
| 2,848,126 | 8/1958 | Taylor | 414/494 X |
| 2,998,890 | 9/1961 | Schwartz | 414/469 |
| 3,082,892 | 3/1963 | Cox | 280/414.1 X |
| 3,097,755 | 7/1963 | Fulcher | 414/538 X |
| 3,122,245 | 2/1964 | MacKusick et al. | 280/414.1 X |
| 3,155,249 | 11/1964 | Johnson | 414/538 X |
| 3,380,607 | 4/1968 | Dale | 280/414.1 X |
| 3,584,753 | 6/1971 | Voeller | 296/157 X |
| 3,647,097 | 3/1972 | Skaggs | 414/494 |
| 3,675,800 | 7/1972 | Weyant et al. | 414/494 |
| 3,768,677 | 10/1973 | Moss | 414/494 X |
| 3,785,677 | 1/1974 | Calkins | 280/414.1 |
| 3,812,988 | 5/1974 | Pyle | 414/494 X |
| 3,822,899 | 7/1974 | Slack | 280/414.1 |
| 3,917,087 | 11/1975 | Godbersen | 193/35 CX |
| 4,011,958 | 3/1977 | Carrick | 414/529 |
| 4,114,920 | 9/1978 | Boettcher | 414/529 X |
| 4,319,862 | 3/1982 | Cook | 414/529 X |
| 4,519,738 | 5/1988 | Wood | 414/494 X |

FOREIGN PATENT DOCUMENTS

| | | | |
|---|---|---|---|
| 530190 | 3/1932 | Fed. Rep. of Germany | 280/414.1 |
| 414049 | 8/1910 | France | 414/494 |

Primary Examiner—Frank E. Werner
Assistant Examiner—Robert S. Katz
Attorney, Agent, or Firm—Guy E. Matthews

[57] ABSTRACT

The apparatus includes a truck body having a forward cab section and a rear bed section, the bed section adapted to further provide a plurality of horizontal members, comprising a truck bed, the members positioned atop a rear axle for defining a bed portion for accommodating a boat thereupon. There is further included a rear section of the bed portion hingedly engaged to the rear portion of the frame which is movable from a horizontal position to form the rear portion of the bed to a position so that the rearward most end of the bed moves downward to a position adjacent the ground for slidingly accommodating a boat thereupon. There is further included a winch adjacent the rear portion of the truck cab, the winch including an extendable line attachable to the front portion of the boat so that as the line is winched in, the boat is pulled up the rear ramp member and is slid to a position on the bed portion of the truck. Upon the boat being pulled in the resting position on the bed, the rearward most ramp portion is returned to the complete horizontal position by the weight of the boat, and is locked in place for transport of the boat.

5 Claims, 4 Drawing Sheets

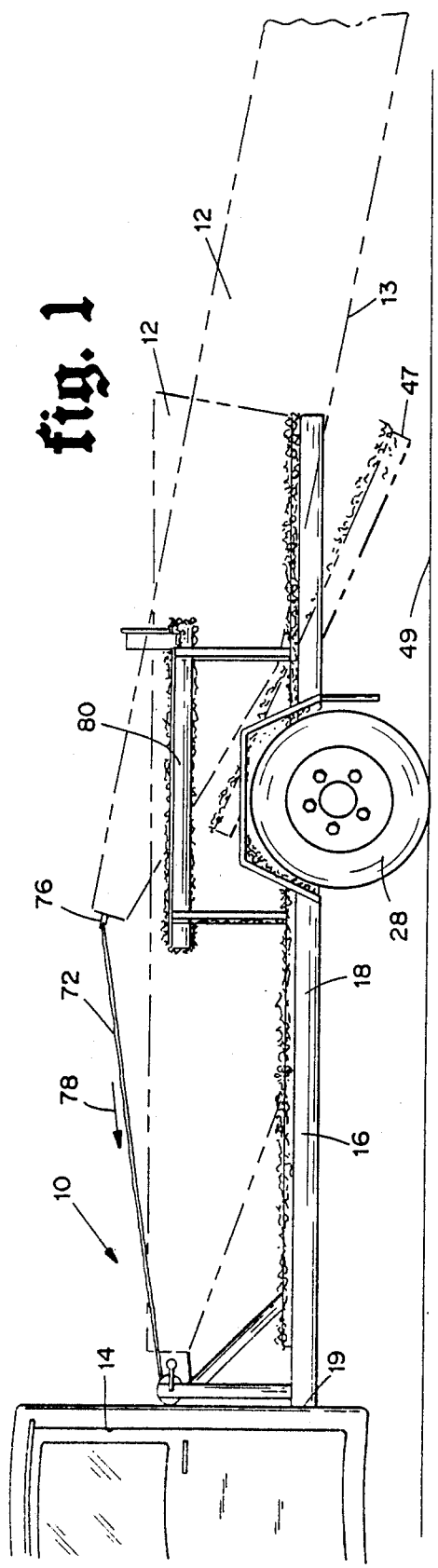
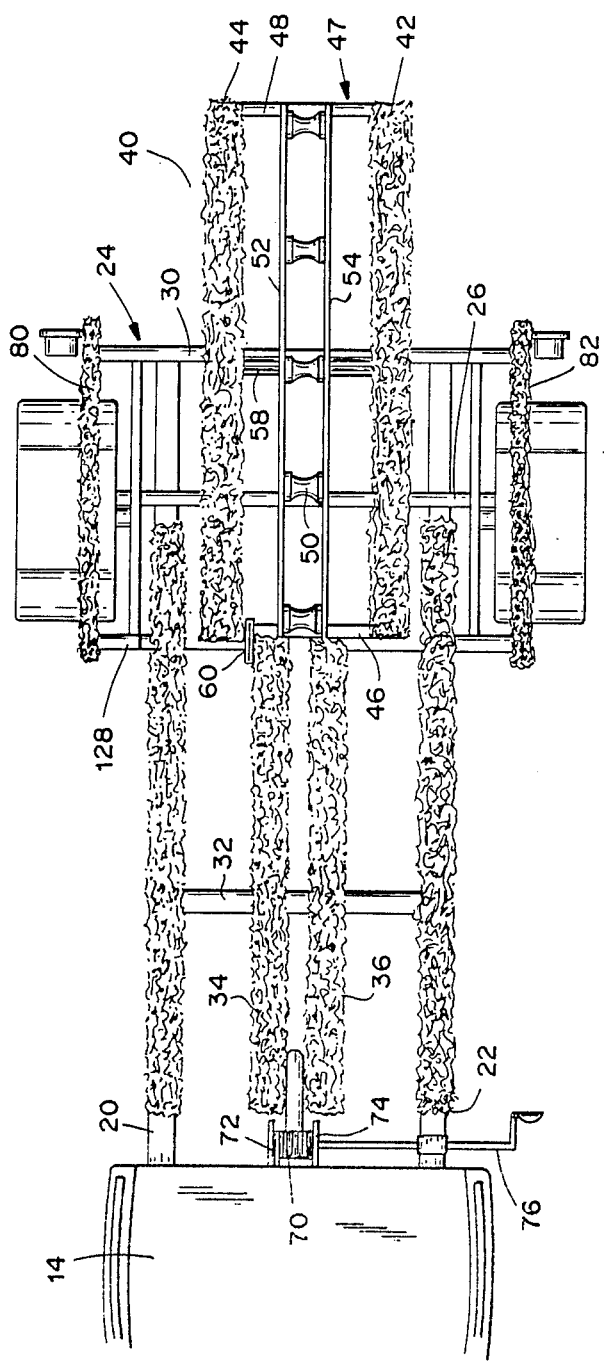

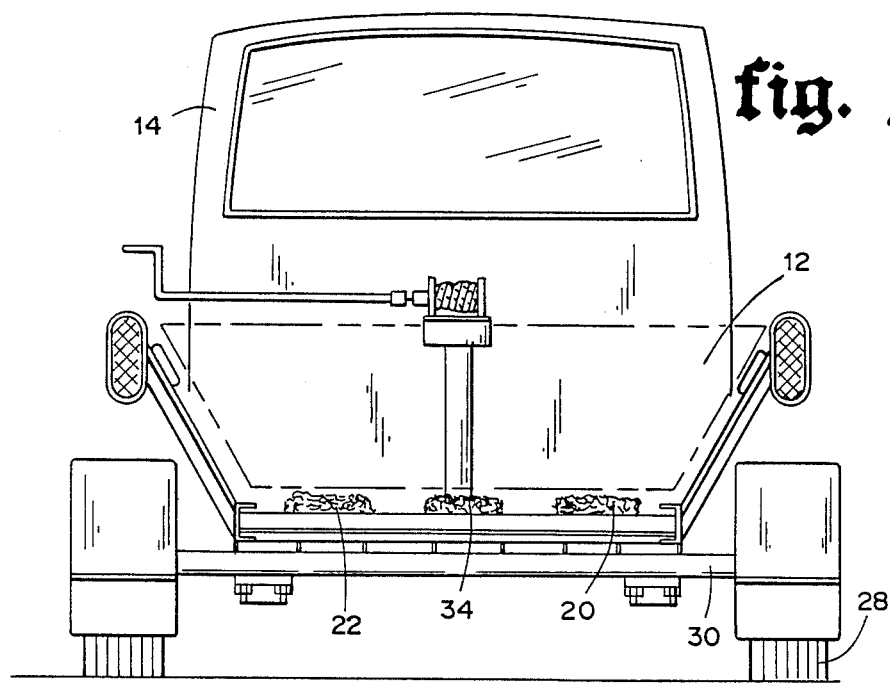
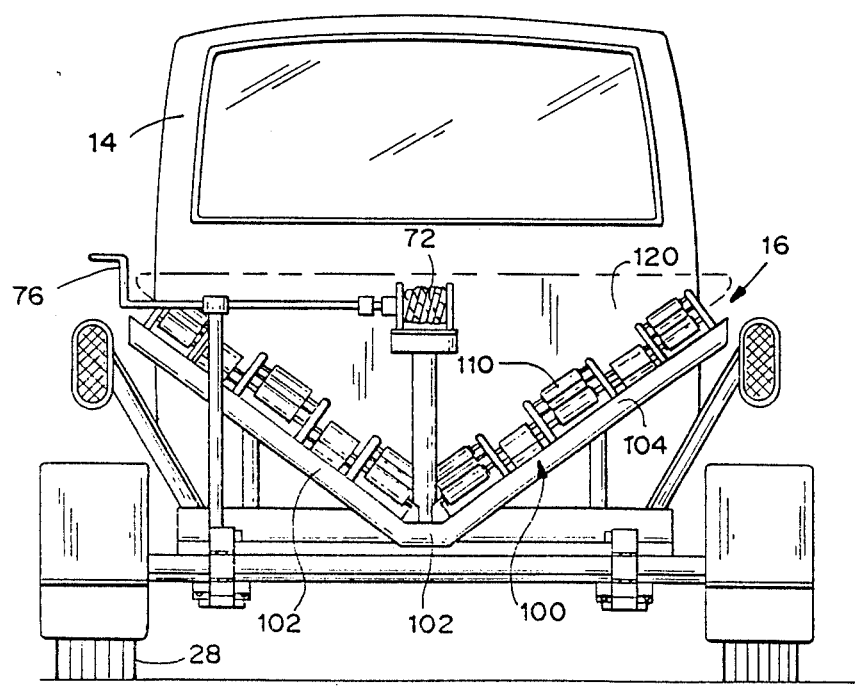

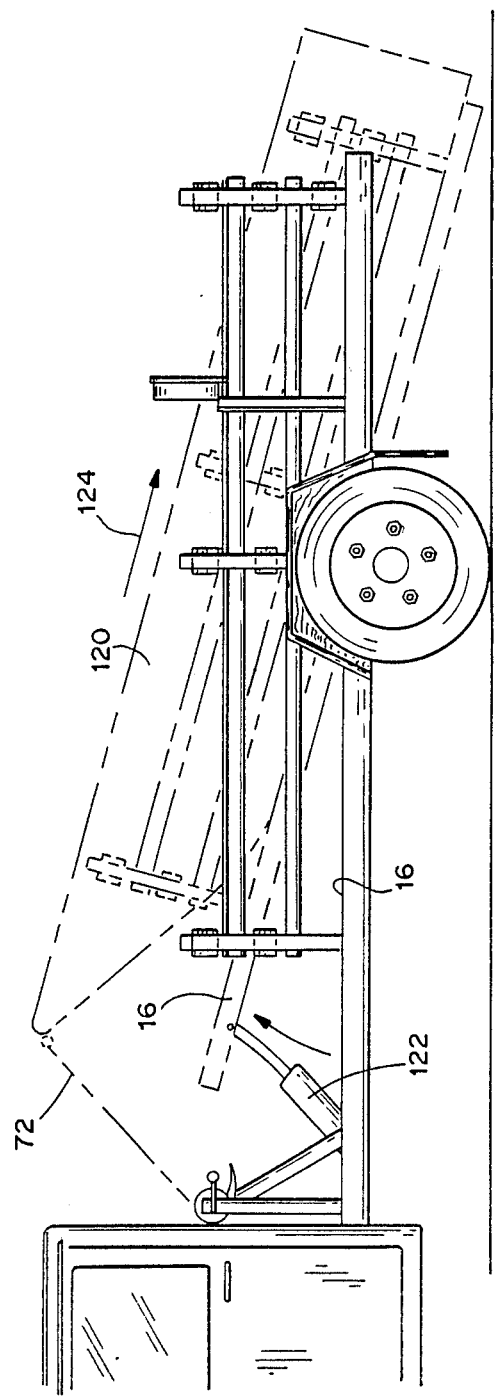

COMBINATION TRUCK AND BOAT TRAILER APPARATUS

BACKGROUND OF THE INVENTION

1. Field of the Invention

The apparatus of the present invention relates to boat trailers. More particularly, the apparatus of the present invention relates to a combination truck and small boat trailer combined in a unitary assemblage so that the boat trailer is integral to the truck body.

2. General Background

It is very common in the art of carrying small boats such as flat boats or "bass" boats, a boat trailer is utilized, which comprises a separate trailer body for placement of the boat thereupon, and the trailer body including a forward hitch so that it is secured to the rear bumper portion of a vehicle, and move along behind the vehicle in tandem. This particular arrangement of a trailer accommodating a boat is well known in the art, and actually comprises the present state of the art in the transportation of small boats over a distance as pulled behind the vehicle. There are several patents granted in respect to boat trailers, the most pertinent being as follows:

| PATENT NO | INVENTOR | TITLE |
|---|---|---|
| 4,489,977 | Earing, Jr. | "Pickup Truck With Interchangable Bed Components" |
| 4,621,857 | Jagers | "Motor-Vehicle Trailer For Transporting Removable Superstructures" |
| 4,420,181 | Hallburg | "Boat-Canopy For Truck Beds" |
| 4,363,590 | Crate | "Power Operated Boat Loading/Unloading Marine Trailer" |
| 3,834,753 | Heiter, et al | "Combination Boat And Utility Trailer Structure" |
| 3,578,190 | May | "Multipurpose Trailer" |
| 3,524,659 | Filter | "Multi-Purpose Transportation Apparatus" |
| 3,118,552 | Jai | "Dual-Purpose Trailer" |
| 3,098,674 | White | "Vehicle Body Convertible From A Flat Bed To A Boat Carrier" |
| 2,720,413 | Halverson | "Multi-Purpose Trailer" |
| 1,896,254 | Smith | "Detachable Body" |

SUMMARY OF THE PRESENT INVENTION

The apparatus of the present invention introduces a novel approach to the transporting of flat boats or small boats via a vehicle. The apparatus includes a truck body having a forward cab section and a rear bed section, the bed section adapted to further provide a plurality of horizontal members, comprising the truck bed, the members positioned atop a rear axle for defining a bed portion for accommodating a boat thereupon. There is further included a rear section of the bed portion hingedly engaged to the rear portion of the frame which is movable from a horizontal position to form the rear portion of the bed to a position so that the rearward most end of the bed moves downward adjacent yet above the ground for slidingly accommodating a boat thereupon. There is further included a winch adjacent the rear portion of the truck cab, the winch including an extendable line attachable to the front portion of the boat so that as the line is winched in, the boat is pulled up the rear ramp member and is slid to a position on the bed portion of the truck. Upon the boat being pulled in the resting position on the bed, the rearward most ramp portion is returned to the complete horizontal position by the weight of the boat, and is locked in place for transport of the boat. There may be further included a plurality of roller members on the bed portion to facilitate movement of the boat along the bed during storage.

In a second embodiment, the bed portion of the truck further includes a plurality of roller members positioned in a V-shape to accommodate a V-hull boat, with the entire bed of the truck serving as a ramp that is hydraulically lifted to an angulated position so that the boat may easily be pulled onto the bed from the rear via the roller track, and may be set upon the truck with the bed hydraulically being returned to the horizontal position. In the unloading, likewise the bed is hydraulically inclined so that the boat may be unwinched and rolled rearwardly into the water for use.

Therefore, it is a principal object of the present invention to provide a unitary boat trailer and truck for the transport of smaller boats such as flat boats, bass boats or V-shape hull boats;

It is still a further object of the present invention to provide a composite truck - boat trailer wherein the boat trailer is an integral part of the truck body so that the boat may be accommodated thereupon; and It is still a further object of the present invention to provide a truck - boat trailer combination so that a rear portion of the trailer may serve as a lifting ramp for pulling of the boat thereupon in position on the trailer for transport.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 1 is an overall side view of the preferred embodiment of the apparatus of the present invention;

FIG. 2 is a top view of the preferred embodiment of the apparatus of the present invention;

FIGS. 4 and 5 are side and rear views respectively of the apparatus of the present invention with a boat positioned thereupon;

FIG. 6 represents an rear view of an alternative embodiment of the apparatus of the present invention; and FIG. 7 represents a side view of the alternative embodiment of the apparatus of the present invention.

DETAILED DESCRIPTION OF THE PREFERRED EMBODIMENT

Figure 3:
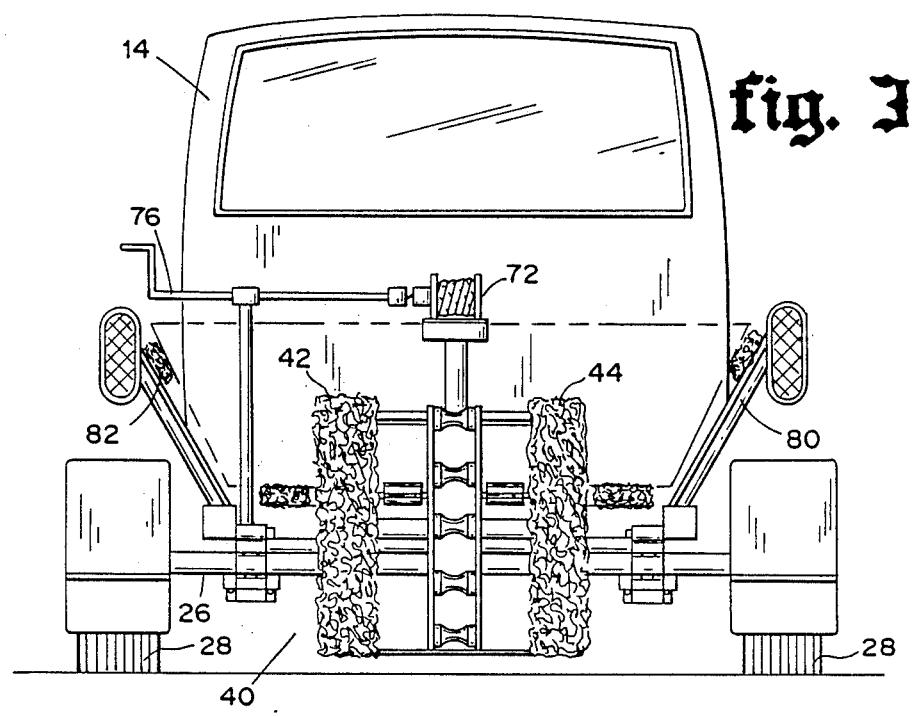
FIG. 3 is a rear view of the preferred embodiment of the apparatus of the present invention.
Figure 4:
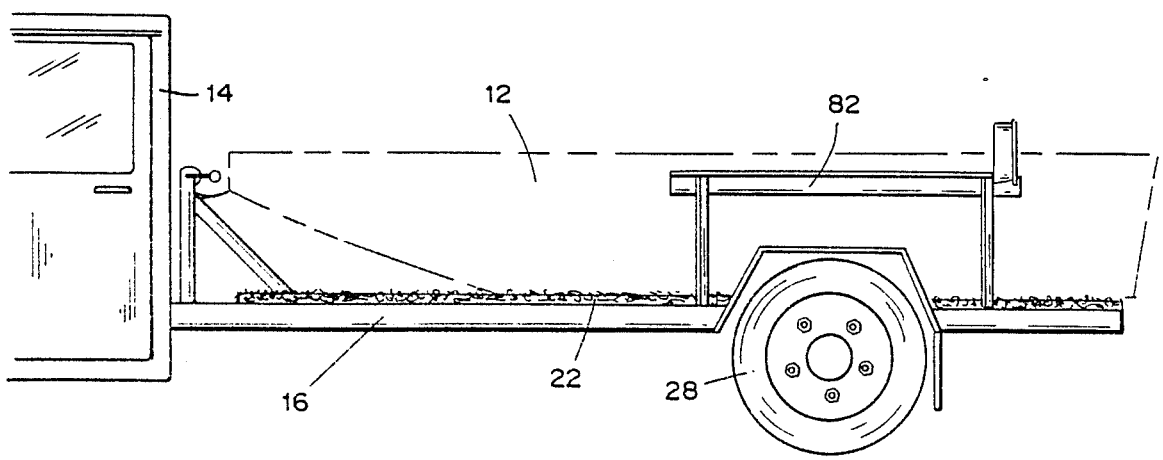

FIGS. 1-5 illustrate the preferred embodiment of the apparatus of the present invention by the numeral 10. As seen in the Figures, apparatus 10 comprises a unitary truck and boat trailer apparatus for transport of a boat 12, such as a flat boat, or a common "bass" boat, or other similar relatively small size boats. The apparatus 10 would further include a forward truck or vehicle cab 14, which is rigidly attached to the means 16 for transporting the boat thereupon. This means 16 further includes a rear truck bed section 18 which comprises a pair of side frame members 20 and 22 rigidly attached at point 19 to cab 14 and extending rearwardly to a rear bed portion 24, which comprises a single rear axle 26 accommodating a pair of wheel members 28 on its ends, to provide the support for transport means 16 during transport of boat 12. Frame 24 would further comprise forward transverse frame member 128 and rearward transverse frame member 30 to provide the composite rear bed that axle 26 is a part thereof. In addition, there would be a forward transverse frame member 32 interconnected between the pair of rear extending frame members 20 and 22 to provide additional rigidity to transport means 16. Further, as seen in top view in FIG. 2, there is additionally provided a pair of inner rearwardly extending frame members 34 and 36 which extend substantially from a point adjacent cab 14 rearwardly to the forward most transverse frame member 128 of bed 24. Again, the series of extended frame members 20, 22, 34 and 36 serve to provide a means for supporting the bottom 13 of boat 12 during transport.

As part of the system for transporting boat 12 with the apparatus 10, the rear transport means 16 further includes a movable ramp means 40, which includes a pair of rearwardly extending horizontal members 42 and 44 which extend substantially rearwardly from the forward most transverse member 128 to a point rearward of rear transverse member 30 to accommodate the length of boat 12 as seen in phantom view in FIG. 1. In addition, frame members 42 and 44 are held in rigid parallel relationship via a forward frame transverse bar 46 and a rear transverse bar 48. In addition, there is included a plurality of free rolling roller members 50 such as the type that is found on most typical boat trailers, the rollers 50 made of hard rubber to accommodate the movement of the boat onto an off of the transport means 16 during use. As seen in the Figure, roller members 50 are accommodated via a pair of frame members 52 and 54 which as is typical has an axle through each of the roller members to accommodate free rolling of the members during use.

An important aspect of rear ramp 40 includes the provision that ramp 40 may move from a first complete horizontal position as seen from top view in FIG. 2 and rear view in FIG. 5, to a less than horizontal position as seen in FIG. 1 with the rear most end 47 of ramp 40 being adjacent to the ground 49, but not resting thereupon, so that a boat may more easily move thereupon from the boat being in a position flush upon ground 49 and it moves up ramp 40. Ramp 40 is able to tilt from the horizontal position to the position as seen in phantom view in FIG. 1 via a hinged connection at 58 so that as ramp 40 is hinged to rear bar 30, ramp 40 may move from the position as previously discussed.

To complete the system, there is further included a U-shaped bar member 60 which would be a means for locking ramp 40 in the horizontal position following the placement of boat member thereupon or during transport of the apparatus, so that as ramp member 40 is placed in the horizontal position, bar 60 is rotated to lock ramp 40 into position on transport means 16.

Further, there is included a winch means 70 situated on the rear of cab 14, which winch means 70 including a spool member 72 having a length of cable or the like 74 wound therearound with a winch handle 76 extending outwardly beyond the side wall of cab 14 so that one may easily crank crank member 76 at a point away from the spool 72 to prevent possible danger. As seen in FIG. 1, boat member 14 would be attached via cable 70 at a front lifting loop 76, and as cable 72 is winched inwardly in the direction of Arrow 78, boat member is pulled up ramp 40, and placed in position as seen in side view in FIG. 4. At that point, ramp portion 40 is returned to the horizontal position and will be maintained in that position, via the weight of boat member 12 during transport. Further, to assure that boat member 12 is maintained on transport means 16, there is further provided a pair of side guards 80 and 82 which serve to maintain boat 12 in position on frame 16 as seen in rear view in FIG. 5.

FIGS. 6 and 7 further illustrate an additional embodiment of the apparatus in the transport of boats. FIGS. 6 and 7, although accommodating many of the features of the preferred embodiment, presents a construction of transport means 16 as seen in rear view in FIG. 6 to accommodate a V-shaped hull boat. As seen in the Figures, the configuration would generally comprise a V-shaped main frame 100, having an apex 102 to accommodate the lower most V of the boat, and a pair of frame members 102 and 104 extending at an angle upward each of the arms including a plurality of roller members 110 so that the V-shape hull may set upon roller members 110 during transport of the boat 120 as seen in rear view in FIG. 6. The principal difference between the alternate embodiment and the principal embodiment is the fact that in order to accommodate boat 12 onto the frame 100, rather than have the rear ramp portion 40 as seen in the principal embodiment, the entire frame 16 as seen in side view in FIG. 7 is hingedly engaged onto axle member 26, and is provided with a means for lifting frame 16 from the horizontal position as seen in full view in FIG. 7 to the up position as seen in phantom view in FIG. 7. Therefore, hydraulic means 122 allows the entire ramp to be lifted in the position and boat member 120 which is attached on its front end via line 72 is able to be allowed to move rearwardly in the direction of Arrow 124 to a point in the water or the like. Likewise, when the boat is ready to be retrieved, the boat is attached via lines 72, and ramp 16 is lifted to the up position so that boat member is pulled onto ramp 16, and with the retraction of hydraulic means 122, the ramp is placed in the down position to allow transport of V-shape hull 120 on the apparatus. In either embodiment, in order to facilitate the placement of the boat onto the trailer portion, or the release of the boat into the water, the vehicle portion of the apparatus would be accommodated with front wheel drive so as to prevent the possibility of the rear wheels, being power driven, from getting bogged down in the bank of the body of water to which the boat was being placed or retrieved. Although this is not necessarily a component of the invention, it is a prerequisite to assure that the combination boat trailer and vehicle apparatus function in the proper manner.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A combination boat and trailer truck apparatus, comprising:
  a. a cab portion for accommodating a driver of the truck;
  b. a rearward extending frame rigidly secured to and in integral relationship to the cab portion, said frame being supported near the rearward end by a wheeled axle, and comprising:
    i. a first pair of parallel rigid frame members rigidly connected to and extending rearward from said cab;

ii. first and second transverse members rigidly connecting said first pair of frame members on either side of said axle;
iii. a third transverse member rigidly connecting said first pair of frame members intermediate said cab and said first and second transverse members;
iv. a ramp member hingedly connected to the most rearward of said transverse members and extending forward at least as far as the forward most of said first and second transverse members and extending rearward beyond said most rear transverse member; and
v. a second pair of parallel rigid frame members inside said first pair of parallel frame members and supported by forward most of said first and second transverse members and by said third transverse member, said second pair of parallel rigid frame members being adapted to support the front of a boat to be transported;

c. first and second side rails connected to and extending parallel to and above and outside of said first parallel side members for providing support to said boat; and
d. means extending from a point adjacent the cab portion and engageable to the boat to pull the boat up the ramp member onto the frame.

2. The apparatus in claim 1, further comprising a plurality of rollers centrally located along a portion of the frame for accommodating the boat being moved along the frame.

3. The apparatus in claim 1, further comprising a forward axle on the cab portion for providing power means to power the vehicle.

4. The apparatus of claim 1 wherein there is further included means for engaging the ramp member and securing it in the horizontal position.

5. The apparatus of claim 1 further comprising a plurality of rollers located substantially in the central portion of the ramp member to assist in the movement of the boat up the ramp member onto the frame.

* * * * *